(12) United States Patent
Meyer et al.

(10) Patent No.: US 8,199,916 B2
(45) Date of Patent: Jun. 12, 2012

(54) SELECTIVELY LOADING SECURITY ENFORCEMENT POINTS WITH SECURITY ASSOCIATION INFORMATION

(75) Inventors: Christopher Meyer, Cary, NC (US); Wuchieh J. Jong, Raleigh, NC (US); Linwood H. Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1202 days.

(21) Appl. No.: 11/964,503

(22) Filed: Dec. 26, 2007

(65) Prior Publication Data
US 2009/0169005 A1     Jul. 2, 2009

(51) Int. Cl.
*H04L 9/08* (2006.01)
(52) U.S. Cl. ........................................ 380/279
(58) Field of Classification Search .............. 380/255, 380/279, 44, 286; 713/153, 154, 168; 709/223, 709/225
See application file for complete search history.

(56) References Cited

U.S. PATENT DOCUMENTS

| | | | |
|---|---|---|---|
| 6,209,101 B1 * | 3/2001 | Mitchem et al. | 726/2 |
| 6,546,486 B1 * | 4/2003 | Perlman et al. | 713/153 |
| 6,760,444 B1 * | 7/2004 | Leung | 380/270 |
| 7,055,027 B1 | 5/2006 | Gunter et al. | |
| 7,191,331 B2 * | 3/2007 | Maufer et al. | 713/153 |
| 7,477,626 B2 * | 1/2009 | Chen et al. | 370/331 |
| 7,609,162 B2 * | 10/2009 | Kim et al. | 340/572.1 |
| 7,616,615 B2 * | 11/2009 | Sueyoshi et al. | 370/338 |
| 7,805,754 B2 * | 9/2010 | Song et al. | 726/4 |
| 7,849,495 B1 * | 12/2010 | Huang et al. | 726/1 |
| 2003/0126468 A1 * | 7/2003 | Markham | 713/201 |

FOREIGN PATENT DOCUMENTS

| | | |
|---|---|---|
| KR | 20060083113 | 7/2006 |
| WO | WO0163881 | 8/2001 |
| WO | WO03/049357 | 6/2003 |

OTHER PUBLICATIONS

International Search Report and Written Opinion dated Jul. 7, 2009 for PCT/EP2008/066824.

* cited by examiner

*Primary Examiner* — Beemnet Dada
(74) *Attorney, Agent, or Firm* — Jose Gutman; Fleit Gibbons Gutman Bongini & Bianco PL

(57) ABSTRACT

A method, network element, and computer storage program product, are provided for selectively loading a communication network security enforcement point ("SEP") with security association ("SA") information for inspection of encrypted data in a secure, end-to-end communications path. At least one encrypted data packet is received. It is determined that SA information for decrypting the at least one encrypted data packet fails to exist locally at the SEP. A request is sent to a communication network key server for SA information associated with the at least one encrypted data packet. The SA information associated with the at least one encrypted data packet is received from the communication network key server.

15 Claims, 11 Drawing Sheets

SELECTIVELY LOADING SECURITY ENFORCEMENT POINTS WITH SECURITY ASSOCIATION INFORMATION

CROSS-REFERENCE TO RELATED APPLICATION

This application is related to application Ser. No. 11/953,033, filed on Dec. 8, 2007, entitled "Dynamic Selective Obfuscation of Information for Multiparty Transmission", and application Ser. No. 11/738,500, filed on Apr. 22, 2007, entitled "Security Enforcement Point Inspection Of Encrypted Data In An Encrypted End-To-End Communications Path", which are both assigned to the same assignee as the present application and the collective teachings of which are hereby incorporated by reference.

FIELD OF THE INVENTION

The present invention generally relates to the field of content network security, and more particularly relates to security enforcement point processing of encrypted data in a communications path.

BACKGROUND OF THE INVENTION

Internet security has increasingly become the focus of information technologists who participate in globally accessible computer networks. In particular, with the availability and affordability of broadband Internet access, even within the small enterprise, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet malfeasors.

To address the vulnerability of computing devices exposed to the global Internet, information technologists intent to provide true, end-to-end security for data in the Internet through secure communications. The Internet Security Protocol, known in the art as "IPsec" represents a common form of secure communications for use over the Internet. In IPsec, communications between source and destination nodes over a communications path in the Internet can be administered in accordance with a security association ("SA"). An SA defines how IPsec processing is applied to the communication. IPsec is defined in the Request for Comment (RFC) 2401 superseded by RFC 4301 among other RFCs.

The secured communications path defined between two IPsec endpoints often incorporate one or more security enforcement points such as a firewall. Security enforcement points are often positioned in the midst of an IPsec secure communications path and do not perform IPsec SA processing. In this circumstance, a security enforcement point positioned within the secure communications path will have no method for inspecting encrypted data in a traversing IPsec SA. Consequently, the security function of a security enforcement point in a secure IPsec communications path will have become inoperable as most security functions require access to unencrypted, clear-text data. Current systems generally do not provide the security enforcement points any encryption algorithms or session key information so that security enforcement points can perform their functions correctly.

Therefore a need exists to overcome the problems with the prior art as discussed above.

SUMMARY OF THE INVENTION

In one embodiment, a method is provided for selectively loading a communication network security enforcement point ("SEP") with security association ("SA") information for inspection of encrypted data in a secure, end-to-end communications path. The method includes receiving at least one encrypted data packet. The method further includes determining that SA information for decrypting the at least one encrypted data packet fails to exist locally at the SEP. A request is sent to a communication network key server for SA information associated with the at least one encrypted data packet. The SA information associated with the at least one encrypted data packet is received from the communication network key server.

In another embodiment, another method is provided for selectively loading a security enforcement point ("SEP") with security association ("SA") information for inspection of encrypted data in a secure, end-to-end communications path. The method includes a key sever holding security associations ("SAs") for one or more end-to-end secure communication paths between endpoints. The method further includes receiving SA information associated with an SA from a first endpoint using the SA for an end-to-end secure communications path with a second endpoint. The SA information is stored in memory. The method furthermore includes determining that at least one SEP has registered an interest in the SA. The SA information is sent to the at least one SEP.

In yet another embodiment, a network element for inspecting encrypted data in a secure, end-to-end communications path is disclosed. The network element includes a memory and a processor that is communicatively coupled to the memory. The network element further includes a data traffic manager that is communicatively coupled to the memory and the processor. The data traffic manager is adapted to receive at least one encrypted data packet is received. The data traffic manager is further adapted to determine that SA information for decrypting the at least one encrypted data packet fails to exist locally at the SEP. A request is sent to a communication network key server for SA information associated with the at least one encrypted data packet. The SA information associated with the at least one encrypted data packet is received from the communication network key server for SA.

In another embodiment, a computer storage program product is provided for selectively loading a communication network security enforcement point ("SEP") with security association ("SA") information for inspection of encrypted data in a secure, end-to-end communications path. The computer storage program product comprises instructions for receiving at least one encrypted data packet. The computer storage program product further comprises instructions determining that SA information for decrypting the at least one encrypted data packet fails to exist locally at the SEP. A request is sent to a communication network key server for SA information associated with the at least one encrypted data packet. The SA information associated with the at least one encrypted data packet is received from the communication network key server.

One advantage of various embodiments of the present invention is that security enforcement points are able to inspect traversing encrypted data in a secure, end-to-end communications path. Stated differently, SEPs are able to decrypt and inspect traffic that is passing through the enforcement point so that security services such as (but not limited to) IP packet filtering, intrusion detection, load balancing and quality of service ("QoS") settings can be applied to the clear-text (decrypted) packet payloads. For example, a security enforcement point ("SEP") disposed within a secure communications path such as that defined between IPsec endpoints, can establish a secure encrypted session with a key server.

Once the secure encrypted session has been established, the portions of SA information that the SEP needs to perform IPsec decapsulation can be securely provided to the SEP. The security enforcement point, in turn, can install the received IPsec SAs so as to decrypt traversing data originating from corresponding IPsec endpoints into clear-text so as to perform one or more security functions provided by the security enforcement point even though the security enforcement remains amidst a secure communications path established between the IPsec endpoints. Another advantage is that preconfigured topographical knowledge of the network is not needed and SA distribution is limited to only the SEPs that have expressed explicit interest in a SA or family of SAs.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and other similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Example of a Network Environment

Figure 1:
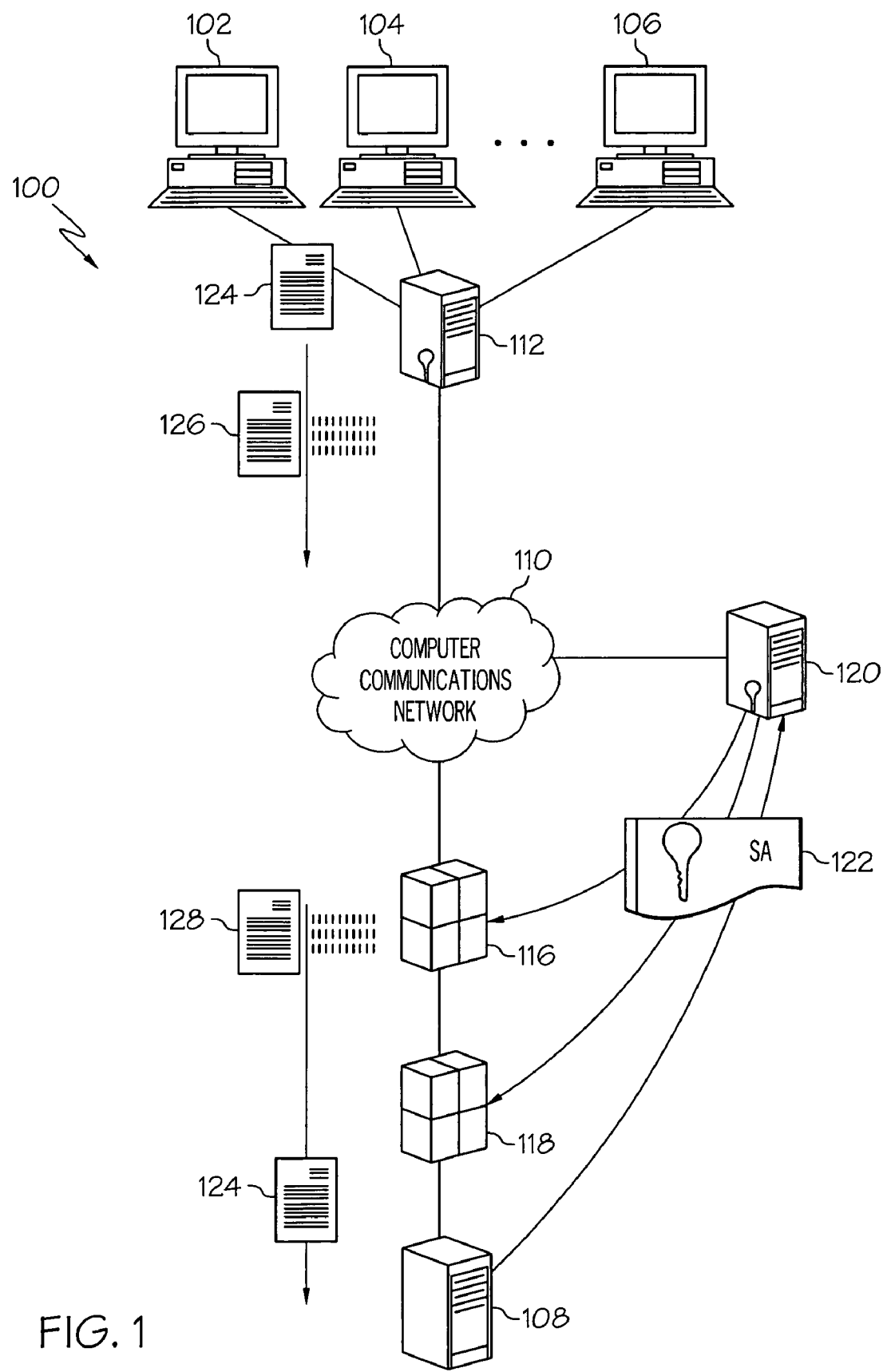
FIG. 1 is a block diagram illustrating one example of a networking environment, according to one embodiment of the present invention.

FIG. 1 is a block diagram illustrating one example of a network data processing system 100 configured for security enforcement point inspection of encrypted data in a secure, end-to-end communications path. One protocol used to established secure end-to-end communications paths is the IPsec protocol as discussed above. However, it should be noted that the present invention is also applicable to other network encryption schemes such as (but not limited to) SSH and SSL/TLS. In IPsec, communications between source and destination nodes over a communications path in the Internet can be administered in accordance with a security association ("SA"). An SA defines how IPsec processing is applied to the communication. IPsec is defined in the Request for Comment (RFC) 2401 superseded by RFC 4301 among other RFCs, which is hereby incorporated by reference in its entirety.

In IPsec, whether the transmission of a packet is denied or permitted with or without IPsec processing is determined by matching the attributes of a packet within the security rules in a security policy database ("SPD"). To make this determination, both the static rules of a security policy and dynamic rules negotiated as part of an Internet Key Exchange ("IKE"), each which refers to an SA as described in RFC 2401, can be subjected to a filtered search in the order of most specific to least specific attributes for both outgoing and incoming packets. The filtering of the attributes of a packet within the security rules can be based upon the source and destination address for the paired nodes engaging in secured communications.

IPsec utilizes a two-phase approach for establishing security associations ("SAs"). An SA is an agreement between two endpoints to apply authentication and/or encryption techniques at each end for creating a secure tunnel between the endpoints. During the first phase of an IPsec connection the SA is built to provide a secure tunnel over which the second phase SAs can be negotiated. During the second phase, the SAs that protect data traffic are negotiated.

In particular, FIG. 1 shows one or more client computing devices 102, 104, 106 communicatively coupled to a server 108 over a computer communications network 110. Each of the client computing devices 102, 104, 106 can be a desktop computer, a notebook computer, a mobile phone, a hand-held computing device, a server, or other similar computing devices. Also, each of the client computing devices 102, 104, 106 can be configured for end-to-end secure communications with the server 108, for instance, through the establishment of a VPN tunnel utilizing IPsec. To that end, a secure server 112 can be coupled to each of the client computing devices 102, 104, 106 and enabled to establish a VPN tunnel with the server 108 on behalf of the client computing devices 102, 104, 106.

One or more security enforcement points 116, 118 can be communicatively coupled to the server 108 in the midst of the end-to-end secure communications path. The security enforcement points 116, 118 can be configured to perform any of several security functions, ranging from packet filtering and intrusion detection to load balancing and QoS management. Notably, as shown in FIG. 1, each of the security enforcement points 116, 118 can be coupled to a key server 120. The key server 120 in turn can be coupled to the server 108. Therefore, the key sever 120, in one embodiment, can maintain an awareness of an SA 122 for the end-to-end secure communications path established by the secure server 112 with the server 108. It should be noted that the SEPs 116, 118 are not required to be connected in serial.

The following is an overview of how the security enforcement points 116, 118 are able to inspect traversing encrypted data in a secure, end-to-end communications path. In one embodiment, an end-to-end secure communications path can be established between one of the client computing devices 102, 104, 106 and the server 108. In the course of establishing the end-to-end secure communications path, the IKE daemon on the secure server 108 can provide the IPsec SA for the end-to-end secure communications path to key server 120. In one embodiment, before loading the SA into the TCP/IP stack for the server 108, thus enabling the end-to-end secure communications path, the SA can be provided to each of the security enforcement points 116, 118 by the key server 120 over a long-standing secure link such as a VPN tunnel between each of the security enforcement points 116, 118 and the key server 120. This embodiment is discussed in greater detail below.

Finally, the key server 120 can notify the server 108 and the server computing device 108 can load the SA into its TCP/IP stack. However, it should be noted that if the SA were installed immediately at the endpoint, potentially some encrypted packets may not be decryptable at the enforcement points 116, 118 since the enforcement points 116, 118 may not yet have the negotiated SA. In this circumstance, the enforcement points 116, 118 can be configured to either discard received packets or let the packets go un-inspected.

Thereafter, a clear-text payload 124 can be transformed into an encrypted payload 126 and transmitted over the end-to-end secure communications path to the server 108 where the encrypted payload 128 can be decrypted into clear-text. At each of the security enforcement points 116, 118 there between, however, the encrypted payload 128 can be decrypted for use in performing associated security functions through the knowledge provided by the SA 122 for the end-to-end secure communications path. As a result, the intermediately disposed security enforcement points 116, 118 can perform security functions on decrypted clear-text without requiring knowledge of the client computing devices 102, 104, 106 and without requiring the client computing devices 102, 104, 106 or the server 108 to have knowledge of the security enforcement points 116, 118.

Selectively Loading Security Enforcement Points With SA Information

Figure 6:
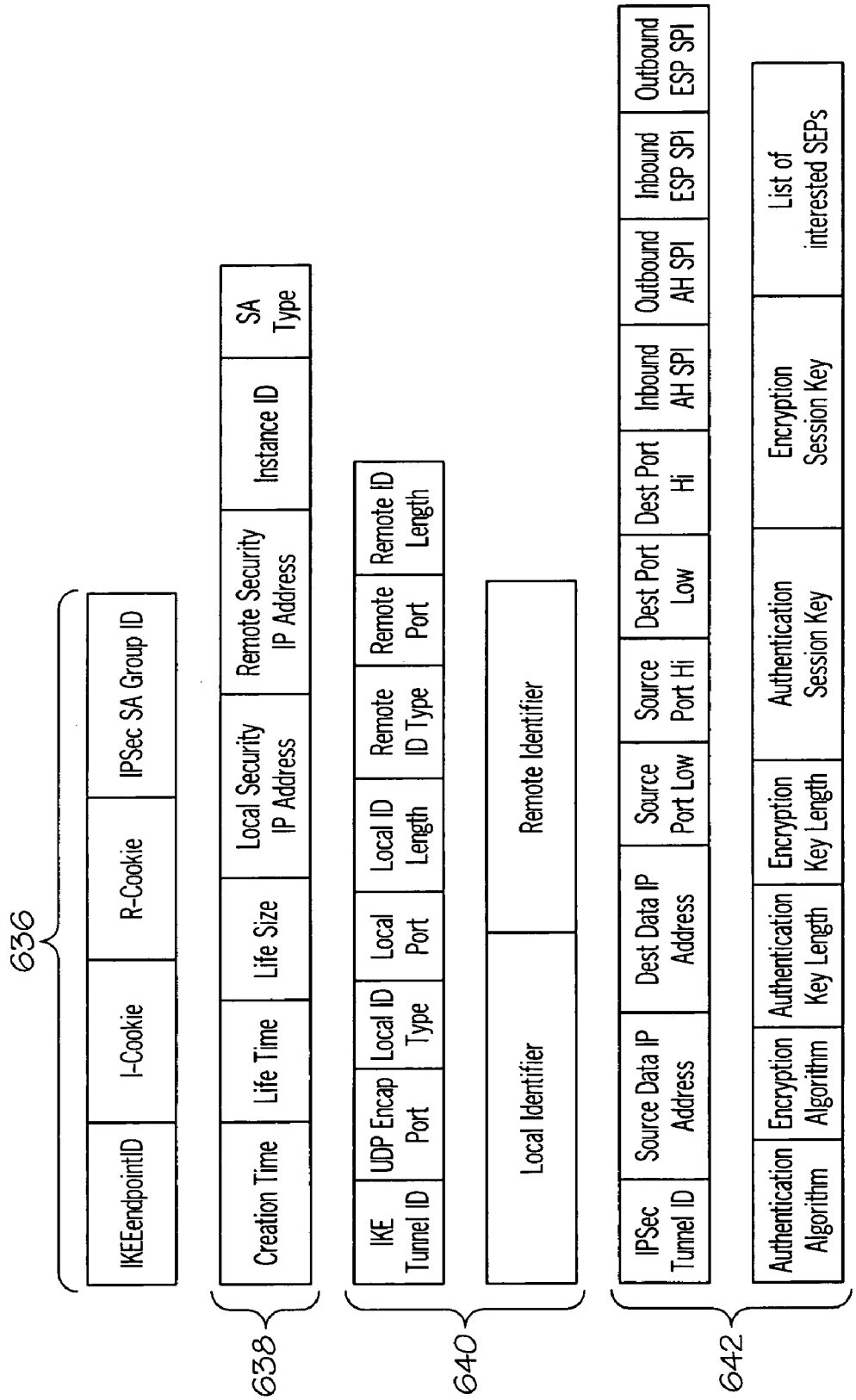
FIG. 6 illustrates one example of an SA record format for storing SA information in a key server according to one embodiment of the present invention.

The following is a more detailed discussion on selectively loading security enforcement endpoints with SA information so that they can inspect traversing encrypted data in a secure end-to-end communications path. Information associated with SAs such as shown in FIG. 6, can be registered at a key server 120. The SEP 116 establishes sessions with the key server 120 so that when the SEP 116 receives traffic communicated over a given SA between two endpoints (e.g., secure server 112 and server 108) the SEP 116 has access to the SA information for decrypting the packets.

In particular, various embodiments of the present invention utilize the long-lived encrypted session that exists between each SEP 116, 118 and the key server 120 to exchange a set of messages between the SEP and key server 120. This messaging exchange allows an SEP 116, 118 to obtain necessary SA information for decrypting traffic being communicated via that particular SA. This messaging exchange can occur in various situations such as (but not limited to); 1.) when an SEP is presented with an IPsec (AH or ESP) SA that it does not recognize; 2.) when a new IPsec (AH or ESP) SA is negotiated under an IKE SA that an SEP is already aware of; and 3.) when an SEP recognizes that a new IKE security association is in use or is being negotiated. IKE is the Internet Key Exchange protocol that is used with IPsec for setting up a SA.

Figure 2:
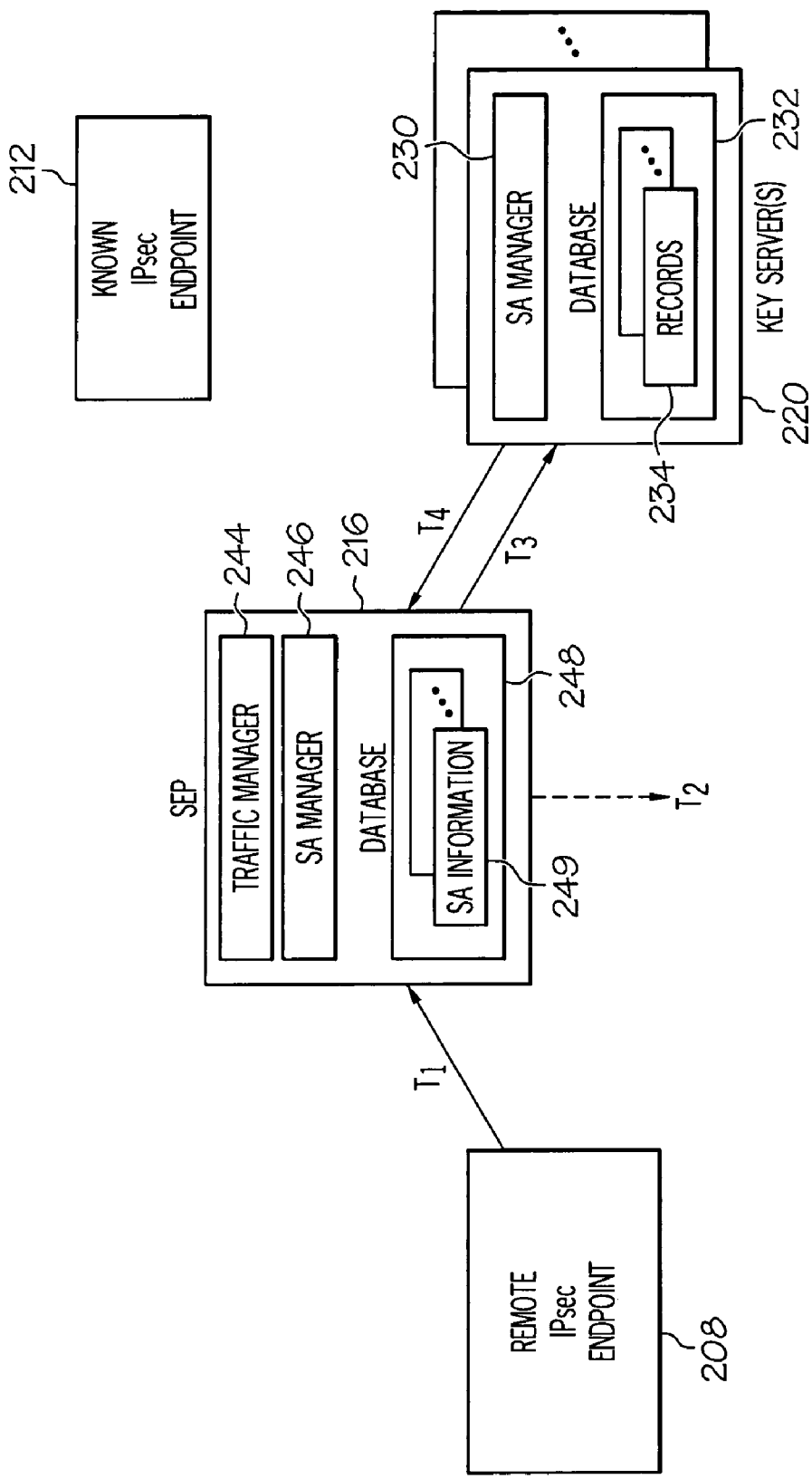
FIGS. 2-5 are block diagrams illustrating different examples of a network data processing system configured for selectively loading SEPs with SA information for inspection of encrypted data in a secure, end-to-end communications path according to one embodiment of the present invention.

FIG. 2 shows one example, of selectively loading one or more SEPs with SA information for processing encrypted traffic being communicated over a secure end-to-end communication path. In particular, FIG. 2 shows a known IPsec endpoint 212 and a remote IPsec endpoint 208 trying to communicate with one another over a secure end-to-end communication path. It should be noted that that in FIG. 2 an IPsec phase 1 session or an IKE SA has already been established between the endpoints 212, 208 and an encrypted session has been setup between the known IPsec endpoint 212 and the key server 220. Also, it is assumed that a persistent secure session is established between the SEP 216 such as through a transport layer security (TLS) session and the key server 220 as discussed above. Therefore, in FIG. 2 an end-to-end secure communications path exists not only between both IPsec endpoints 212, 208, but also separately with the SEP 216 and the key server 220.

The key server 220, in one embodiment, comprises an SA manager 230 and a database 232 comprising information records 234 associated with SA sessions. For example, FIG. 6 shows one example of the type of SA information record 234 maintained by the database 232. In one embodiment, an IPsec endpoint 212, 208 sends this information to the key server 220 once a new SA is successfully negotiated. The key server 220 then stores this information in its database 232 for future reference. The information transmitted to the key server 220 from an endpoint 212, 208 can include a primary key 636 that comprises an endpoint ID, an I-Cookie, R-Cookie, and IPsec SA Group ID information. The endpoint ID uniquely identifies the endpoint that is transmitting the SA information. The iCookie (initiator) and rCookie (responder) are values assigned by each of the endpoints 212, 208 to their end of a phase 1 SA. This allows for a phase 2 SA to be negotiated and to uniquely identify the phase 1 SA. The IPsec SA Group ID field is only populated for Phase 2 SAs and identifies the current SA group that the particular endpoint is associated with.

The SA information record 234 also includes auxiliary data 638 that is maintained for all SAs. This auxiliary data 638 can include (but is not limited) information such as creation time of the SA, life time of the SA, life size of the SA, local security IP address of the SA, remote security IP address of the SA, instant ID of the SA, and the SA type. Phase 1 SA information 640 is also maintained for each SA as well. This Phase 1 information 640 can include (but is not limited) information such as IKE Tunnel ID, UDP Encap port, Local ID type, Local ID length, Remote ID type, Remote IP Length, Local Identifier, and Remote Identifier. The SA information record 234 also includes populates certain fields with Phase 2 SA information 642.

This Phase 2 SA information 642 can include (but is not limited to) IPsec Tunnel ID, Source Data IP Address, Destination Data IP Address, Source Port Low, Source Port Hi, Destination Port Low, Destination Port Hi, Inbound AH SPI (Security Parameter Index), Outbound AH SPI, Inbound ESP SPI, Outbound ESP SPI, Authentication Algorithm, Encryption Algorithm, Authentication Key Length, Encryption Key Length, Authentication Session Key, Encryption Session Key, and List of Interested SEPs. A subset of the above information included within the database 232, including (but not limited to) the identifiers, the encryption parameters and keys, and the authentication parameters and keys is sent down to an interested SEP. This allows the SEP to decrypt traffic that's flowing through it. This process is discussed in more detail below.

Returning to FIG. 2, the SEP 216 includes a traffic manager 244 that manages and monitors data traffic received from endpoints. The traffic manager 244, in one embodiment includes an SA manager 246 for analyzing SA information associated with data traffic and for communicating with the key server 220. In the example of FIG. 2 the SEP 216 receives data traffic from an IPsec endpoint such as the remote IPsec endpoint 208 at time T1. The traffic manager 244 analyzes the data traffic to determine if it is IPsec traffic. For example, the remote IPsec endpoint 208 can send an IPsec SA (with an Authentication Header ("AH") or an Encapsulating Security Payload ("ESP") to the SEP 216. In the example of FIG. 2, the traffic manager 244 determines that the received traffic from the remote IPsec endpoint 208 is IPsec traffic. The traffic manager 244 analyzes information such as SPI/protocol/destinationIPaddr information within the IPsec traffic and determines that it is unaware of the IPsec SA associated with this information. In other words, the SA manager 246 does not have the necessary information to decrypt the data traffic for this particular SA.

Once the SEP 216 detects an SA that it is unaware of, it can allow the traffic (e.g., data packet) to pass uninspected or drop the packet. The SEP 216 can be preconfigured to perform either of these actions. The example in FIG. 2 shows the SEP 216 dropping the data packet at time T2, which forces the originating endpoint (e.g., the remote IPsec endpoint 208) to eventually retransmit the packet. Once the traffic manager 244 either drops the data packet or allows it to pass unchecked, the SA manager 246 queries the key server 220, at time T3, to determine it has SA information for this particular SA. For example, the SA manager 246, in one embodiment, sends a "discover SA" message comprising the SPI/protocol/destinationIPaddr information to the key server 220 over the encrypted session existing between the SEP 216 and the key server 220. Stated differently, the SEP 216 registers an interest at the key server 220 or subscribes to the key server 220 for receiving the SA information for that particular SA. This allows the SEP 216 to dynamically acquire the needed information to decrypt the IPsec data packet(s).

If the key server 220 comprises SA information within its database 232 for this particular SA, the SA manger 230 at the key server 220 extracts the SA information from its database 232 and returns the IPsec SA contents to the SEP 216 at time T4. The key server 220 can also perform other actions as well based on its configured policy. For example, the key server 220 can return the iCookie/rCookie of the IKE SA under which this IPsec SA was negotiated. This is beneficial to the SEP 216 because it is likely that other traffic associated with the IKE SA is going to pass through this SEP 216 in the future. This essentially constitutes an implied "SA interest registration" from the SEP 216 regarding the associated IKE SA.

Once this registration is in place at the key server 216, any new IPsec SAs that are negotiated under the associated IKE SA are automatically delivered to the SEP 216. In one embodiment, the SA manager 230 at the key server 220 manages and maintains SEP subscriptions/registered interests for SAs and any related SAs. The key server 220 can also return SA information for all other known IPsec SAs associated with the IKE SA in anticipation that data protected by those SAs is going to flow through the SEP 216 as well.

Upon receipt of a "discover SA" response message from the key server 220, the SEP 216 stores the SA contents 249 in its local database 248. From this point on, the SEP 216 is able to use the keys in this SA to de-capsulate any data traffic that flows through the SEP 216 over that AH or ESP SA. Likewise, similar entries are created in the SEP's local database 248 for any other SA information that is returned based on the configured policy of the key server 220.

Figure 3:
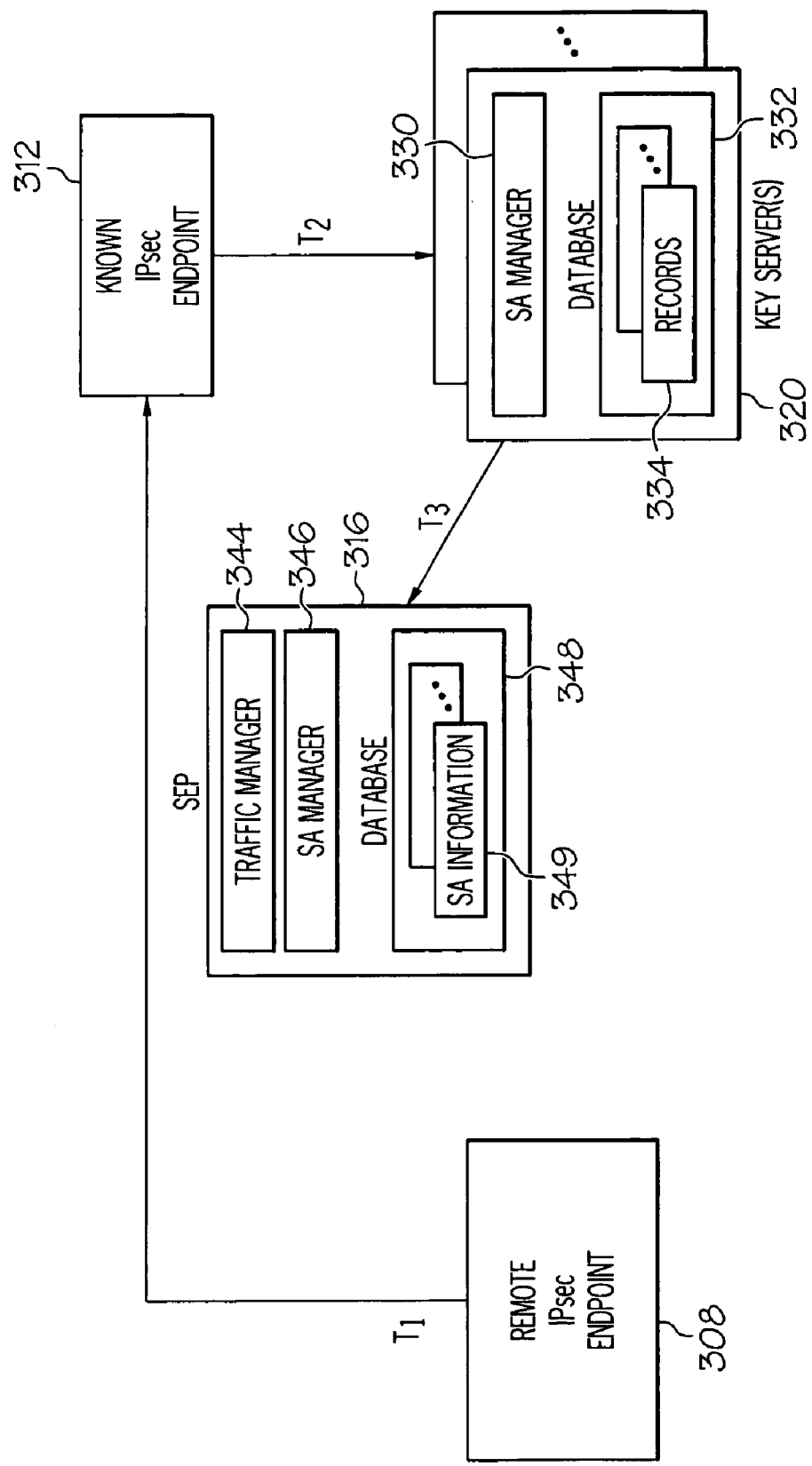

FIG. 3 shows another example of selectively loading one or more SEPs with SA information for processing encrypted traffic being communicated over a secure end-to-end communication path. In particular, FIG. 3 shows a known IPsec endpoint 312 and a remote IPsec endpoint 308 trying to communicate with one another over a secure end-to-end communication path similar to FIG. 3. As in FIG. 3, an IPsec phase 1 session or an IKE SA has already been established between the endpoints 312, 308 and an encrypted session has been setup between the known IPsec endpoint 312 and the key server 320. The persistent secure session between the SEP 316 and the key server 320 discussed above also exists in FIG. 3.

The remote IPsec endpoint 308 in FIG. 3 and the known IPsec endpoint 312, at time T1, negotiate a new IPsec SA across the already established IKE SA (e.g., a VPN tunnel). When the negotiation completes, the known IPsec endpoint 312 sends a "store SA" message, at time T2, comprising the new SPI/protocol/destinationIPaddr information, the new SA contents as well as the associated iCookie/rCookie information to the key server 320 over their encrypted session. Upon receipt of this message, the SA manager 330 in the key server 320 stores the SA in its local database 332 in the format discussed above with respect to FIG. 5.

The SA manager 330 in the key server 320 also analyzes its registered interest/subscriber information to identify any SEPs 316 that are to be selectively loaded with this new SA information. If the SA manager 330 identifies any interested SEPs 316 the SA manager 330 sends a "new SA" message, at time T3 to the registered/subscriber SEP 316, 318. The "new SA" message, in one embodiment includes (but is not limited to) the new SPI/protocol/destinationIPaddr information, the new SA contents, and the associated iCookie, rCookie information. This information is transmitted to the SEPs 316 via the encrypted session that exists between the key server 320 and the SEPs 316.

Upon receipt of this message, the SEP 316 stores the SA contents 349 in its local database 348. This allows the SEP 316 to use keys in this SA for de-capsulating any data traffic that flows through the SEP 316 over that particular IPsec SA. In other words, in the example of FIG. 3, the SA information is sent from the key server 320 to the interested SEP 316 prior to data traffic being received at the SEP 316 for that particular IPsec SA.

Figure 4:
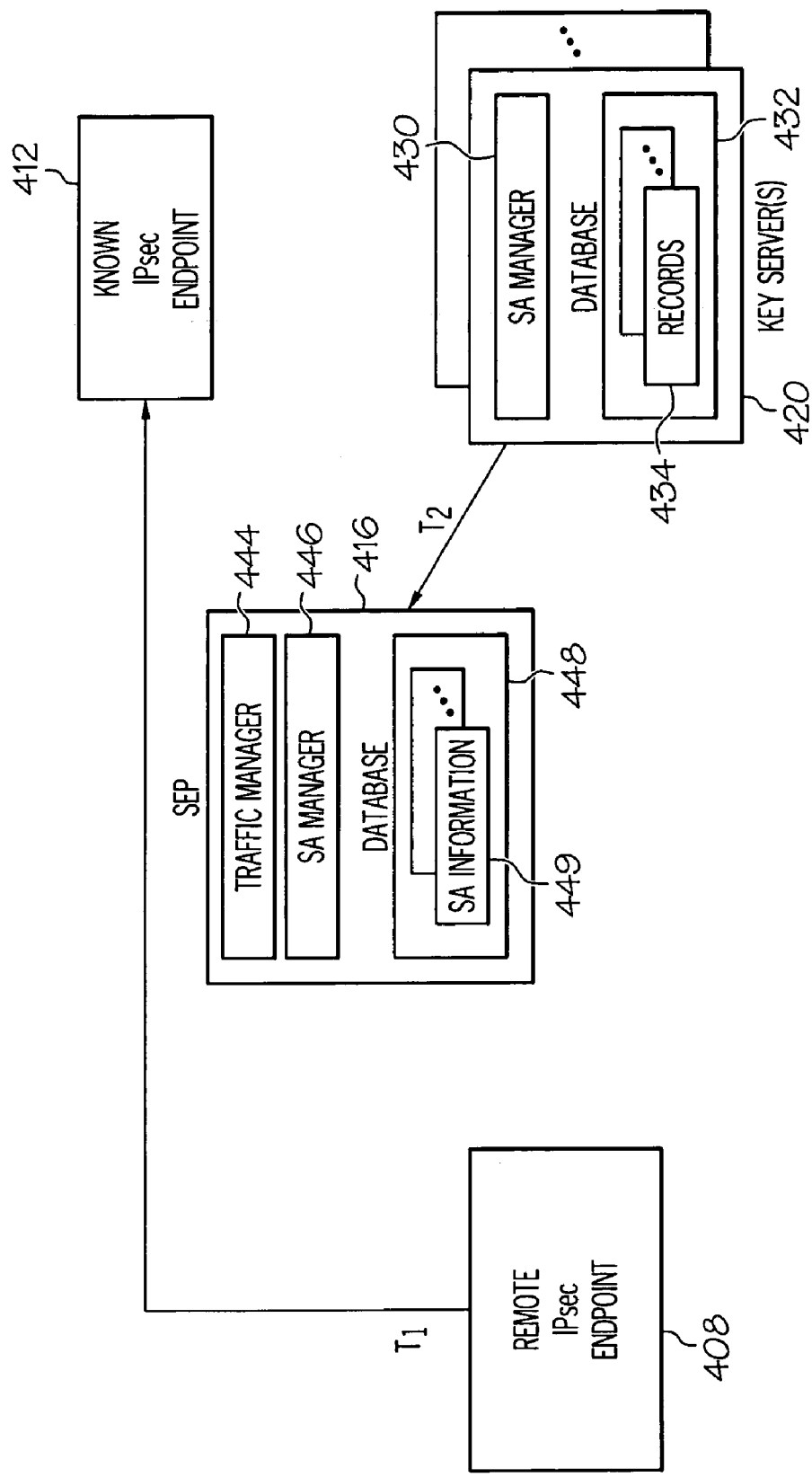

FIG. 4 shows yet another example of selectively loading one or more SEPs with SA information. In particular, FIG. 4 shows a method of selectively loading an SEP 416 with SA information when that SEP 416 detects an IKE message that comprises an unrecognized Initiator Cookie (iCookie) and an unrecognized Responder Cookie (rCookie). The SEP 416 can detect these unrecognized cookies either during the negotiation of a new IKE SA or during the negotiation of a new IPsec SA under the unrecognized IKE SA. When the SEP 416 detects the unrecognized cookies it sends a message to the key server 420 indicating its interest in the SA (identified by its iCookie/rCookie). The key server 420 then creates a new entry in its local database 432 for the new IKE SA and adds the SEP 416 to a list of SEPs that are interested in that particular SA. From that point on, any new IPsec SAs that are established under the IKE SA are automatically forwarded to the interested SEP 416.

For example, FIG. 4 shows that at time T1 the remote IPsec endpoint 408 (or known IPsec endpoint 412) initiates a phase 1 negotiation with a known IPsec endpoint. Alternatively, the two IPsec endpoints 412, 408 exchange an IKE Quick Mode message as part of a Phase 2 negotiation using a IKE SA that the SEP 416 does not recognize (e.g., the iCookie/rCookie are not recognized). The SA manager 446 at the SEP 416 detects the new IKE SA identifier and extracts the iCookie and rCookie values from the ISAKMP header. The SA manager 446 at the SEP 416 sends the iCookie and rCookie values, at time T2, to the key server 420 in a "SA interest registration" message their encrypted session. The SEP 416 then forwards the received data packet on to the target IPsec endpoint.

When the key server 420 receives the registration request from the SEP 416, the key server creates a new SA entry in its SA database 432 for the new IKE SA. The key server 420 also notes that the sending SEP 416 is interested in any IPsec (AH or ESP) SAs that are associated with this particular IKE SA. It should be noted that the key server 420 may choose to implement some sort of activity timeout for a newly registered IKE SA so that IKE SAs that fail to successfully negotiate are eventually cleaned out of the key server database 432. As part of this cleanup, the key server 420 can optionally send a notification to all interested SEPs that the IKE SA is being dropped so that the SEPs can remove the SA from their local storage 448 as well.

Figure 5:
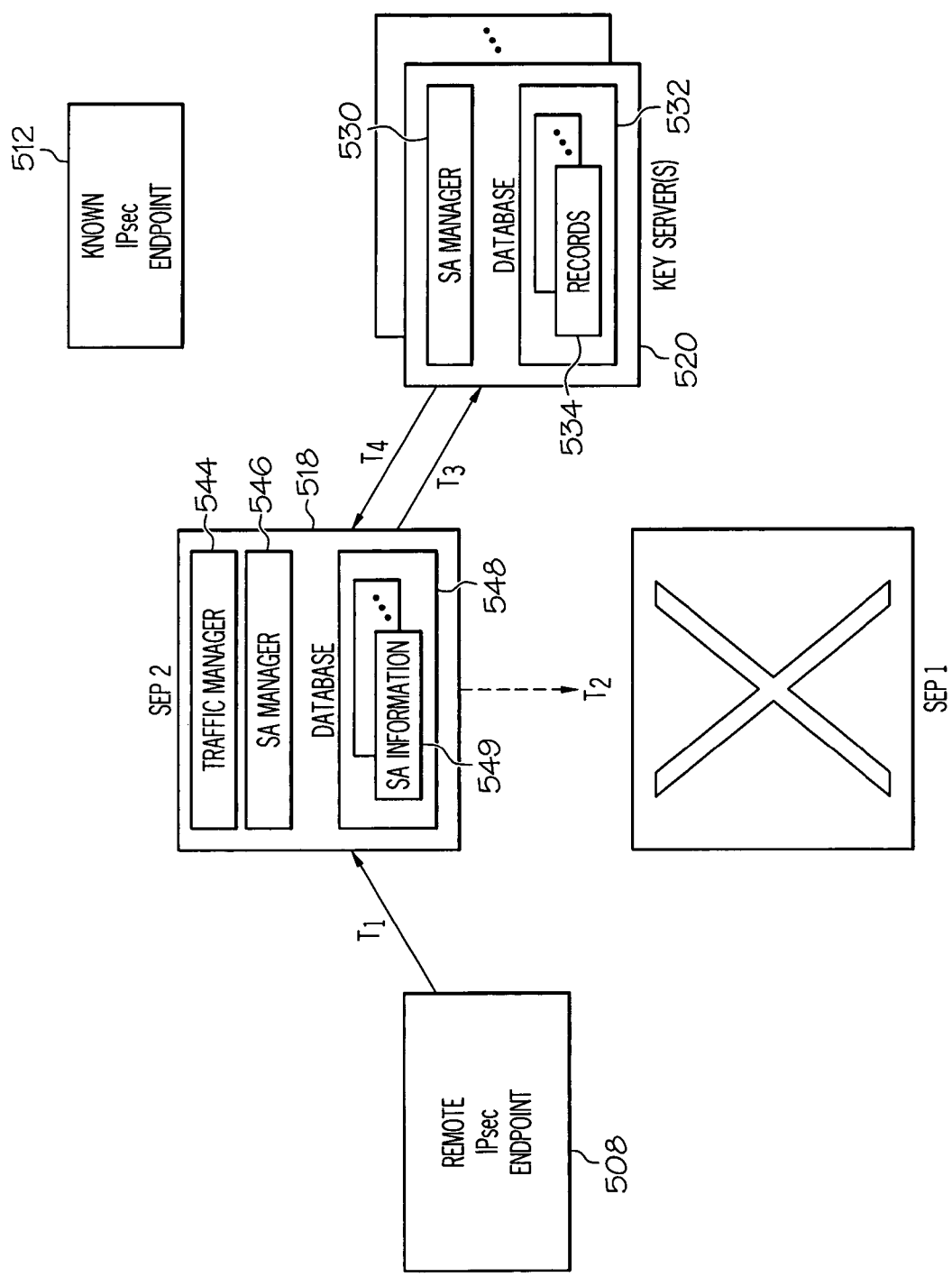

FIG. 5 shows a variation of the process discussed above with respect to FIG. 2. In particular, FIG. 5 shows a special case of example in FIG. 2 caused by a change in IP routing within the network. In FIG. 5, the routing of packets through the network is changed for whatever reasons, so a new SEP 518 dynamically acquires knowledge of the SAs that are now flowing through it. As in FIG. 2, the SEP, SEP 518 is suddenly faced with an SPI/protocol/destinationIPaddr for an unknown AH or ESP SA (time T1). As is discussed above, a choice must be made to either drop or allow the packet (time T2) and then the SEP 518 asks the key server if it knows about the unrecognized SA (T3). If the SA is one that the key server 520 knows about, then it sends the information for that SA and may also send information about the associated IKE SA and other related IPsec SAs.

It should be noted that in addition to the above examples, the key sever 120 can also minimize the number of IKE retransmissions that occur between the IPsec endpoints. Specifically, the key server 120 can effectively suspend the final Quick Mode message exchange between the IKE peers in order to ensure that the SEP 116 has the IPsec SA in place before data traffic begins to flow over that SA. The key server 120 accomplishes this, in one embodiment, by sending the "new SA" message to the SEP 116 before responding to the "store SA" message from the IPsec endpoint 108, 112. Note that the key server 120 only needs to wait for the send to the SEP 116 to complete; it does not need to wait for a response from the SEP 116. When the known IPsec endpoint 112 is the initiator, this happens before the known IPsec endpoint sends Quick Mode message 3 to its peer. When the known IPsec endpoint 112 is the responder, this happens before the known IPsec endpoint 112 sends Quick Mode message 4 (when using commit bit support) or message 2 (without commit bit support) to its peer.

As can be seen the foregoing embodiments of the present invention are advantageous because SEPs can be selectively loaded with SA information for decrypting data packets being communicated over secure end-to-end communication paths. This allows the interested SEPs to obtain the SA information to decrypt the data packets and perform the desired operations. Another advantage is that only interested SEPs are selectively loaded with SA information. This prevents SA information from being unnecessarily released to SEPs that do not require the information, thereby reducing the vulnerability of the SA information.

Example of an Information Processing Node

Figure 7:
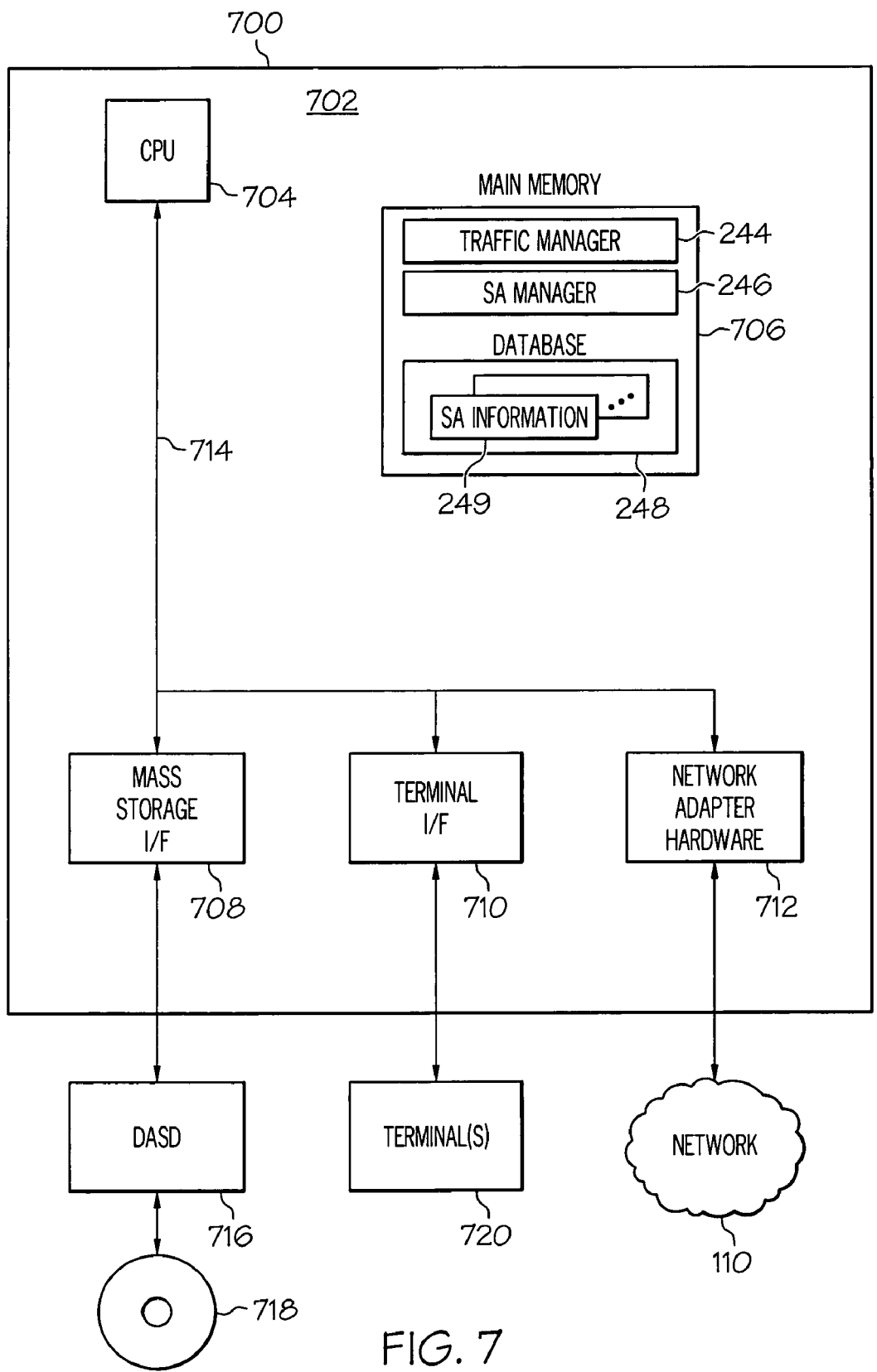
FIG. 7 is a block diagram illustrating a detailed view of an information processing system according to one embodiment of the present invention.

FIG. 7 is a block diagram illustrating a more detailed view of an information processing node 700 such as an SEP 116 or a key sever 120, according to one embodiment of the present invention. It should be noted that the following discussion is with respect to an SEP 116, but is likewise applicable to a key server 120 with the exception of their respective components discussed above.

The information processing node 700 includes a computer 702. The computer 702 has a processor 704 that is connected to a main memory 706, mass storage interface 708, terminal interface 710, and network adapter hardware 712. A system bus 714 interconnects these system components. The mass storage interface 708 is used to connect mass storage devices, such as data storage device 716, to the information processing system 700. One specific type of data storage device is a computer readable medium such as a hard disk drive or other storage drive, flash memory, non-volatile memory, an optical disk, which may be used to store data thereto and read data there from, a CD 718, or a DVD (not shown). Another example of data storage device is a data storage device configured to support, for example, NTFS type file system operations as a network element.

The main memory 706, in one embodiment, includes the traffic manager 244, the SA manager 246, and SA content database 248 (which comprises SA content 249). Although illustrated as concurrently resident in the main memory 706, it is clear that respective components of the main memory 706 are not required to be completely resident in the main memory 706 at all times or even at the same time. In one embodiment, the information processing node 700 utilizes conventional virtual addressing mechanisms to allow programs to behave as if they have access to a large, single storage entity, referred to herein as a computer system memory, instead of access to multiple, smaller storage entities such as the main memory 706 and data storage device 716. Note that the term "computer system memory" is used herein to generically refer to the entire virtual memory of the information processing node 700.

Although only one CPU 704 is illustrated for computer 702, computer systems with multiple CPUs can be used equally effectively. Various embodiments of the present invention further incorporate interfaces that each includes separate, fully programmed microprocessors that are used to off-load processing from the CPU 704. Terminal interface 710 is used to directly connect one or more terminals 720 to computer 702 to provide a user interface to the computer 702. These terminals 720, which are able to be non-intelligent or fully programmable workstations, are used to allow system administrators and users to communicate with the information processing node 700. The terminal 720 is also able to consist of user interface and peripheral devices that are connected to computer 702 and controlled by terminal interface hardware included in the terminal I/F 710 that includes video adapters and interfaces for keyboards, pointing devices, and other devices/interfaces.

An operating system (not shown) included in the main memory is a suitable multitasking operating system such as (but not limited to) the Linux, UNIX, Windows XP, and Windows Server 2003 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing node 700. The network adapter hardware 712 is used to provide an interface to a network 110. Various embodiments of the present invention can be adapted to work with any data communications connections including present day analog and/or digital techniques or via a future networking mechanism.

Although the embodiments of the present invention are described in the context of a fully functional computer system, those skilled in the art will appreciate that various embodiments are capable of being distributed as a computer storage program product via CD or DVD, e.g. CD 718, CD ROM, or other form of recordable media, or via any type of electronic transmission mechanism. Generally, a computer storage program product refers to the program, including variables and data structures as may be part of the program, provided in a memory device and/or storage device and/or computer readable medium.

Operational Flow For SEP Inspection Of Encrypted Data

Figure 8:
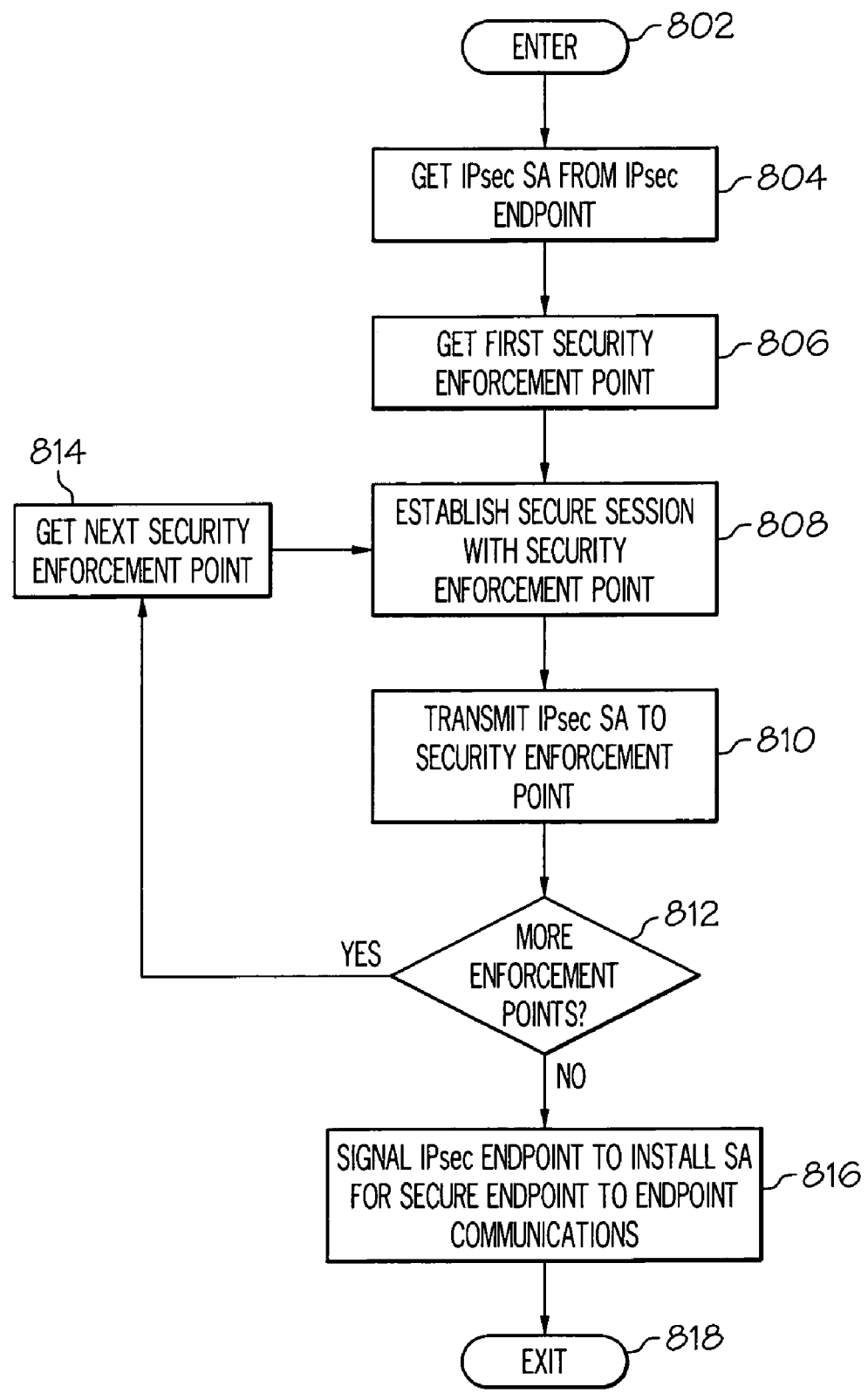
FIG. 8 is an operational flow diagram illustrating an overall process for security enforcement point inspection of encrypted data in a secure, end-to-end communications path according to one embodiment of the present invention.

FIG. 8 is an operational flow diagram illustrating a process of security enforcement point inspection of encrypted data in a secure, end-to-end communications path. The operational flow diagram of FIG. 8 begins at step 802 and flows directly to step 804. An IPsec SA, at step 804, can be received in a key server 120 from an IPsec endpoint 112 during the setup of a VPN tunnel with another IPsec endpoint 108. A first intermediately disposed security enforcement point, at step 806, can be identified in the end-to-end secure communications path. Once the SEP 116 has been identified, at step 808, the SEP 119 establishes a persistent secure session can be established (if not already established) with the key server 120, such as through a transport layer security (TLS) session, so that an end-to-end secure communications path exists not only between both IPsec endpoints 108, 112, but also separately with the SEP 116 and the key server 120.

An IPsec SA for the end-to-end secure communications path between the IPsec endpoints 108, 112, at step 810, can be provided to the SEP 116, across the separate end-to-end secure communications path between the key server 120 and the SEP 116. Subsequently, at step 812, if additional SEPs intermediate to the IPsec endpoints 108, 112 remain to be processed, at step 814, a next SEP can be retrieved and the process beginning at step 808 is repeated. When no SEPs intermediate to the IPsec endpoints 108, 112 remain to be processed the IPsec endpoint 112, at step 816, can be signaled to complete installation of the SA for the end-to-end secure communications path and the SEPs 116 can perform security functions on the encrypted data transmitted between the IPsec endpoints 108, 112 due to the session key knowledge incorporated into the SA for the IPsec endpoints.

Optionally, whereas the SA provided to the SEP 116 can include an encryption key enabling the SEP 116 to access clear-text within encrypted data traversing the Sep 116, the session authentication key can be withheld. In this regard, by withholding the session authentication key, in essence the clear-text decrypted from the encrypted data provided to Sep 116 effectively "read only" in that without the session authentication key, the Sep 116 lacks authorization to alter the content of the clear-text. Conversely, the session authentication key can be provided to the SEP 116 to permit alteration of the clear-text including deleting or blocking selected portions of the clear-text. The control flow then exits at step 818.

Operational Flows For Selectively Loading An SEPs With SA Information

Figure 9:
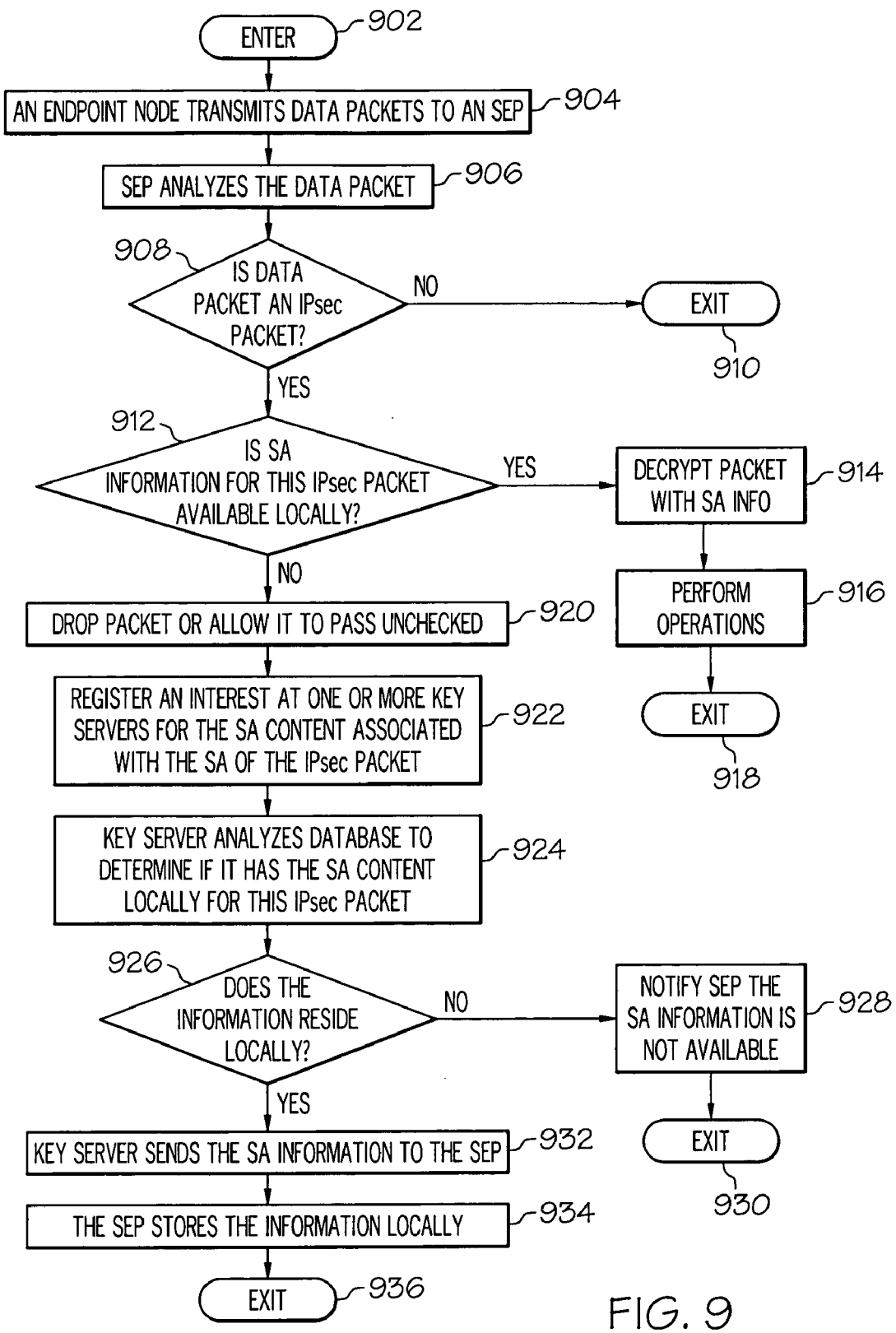
FIGS. 9-11 are operational flow diagrams illustrating various processes for selectively loading an SEP with SA information for decrypting encrypted IPsec packets according to one embodiment of the present invention.
Figure 10:
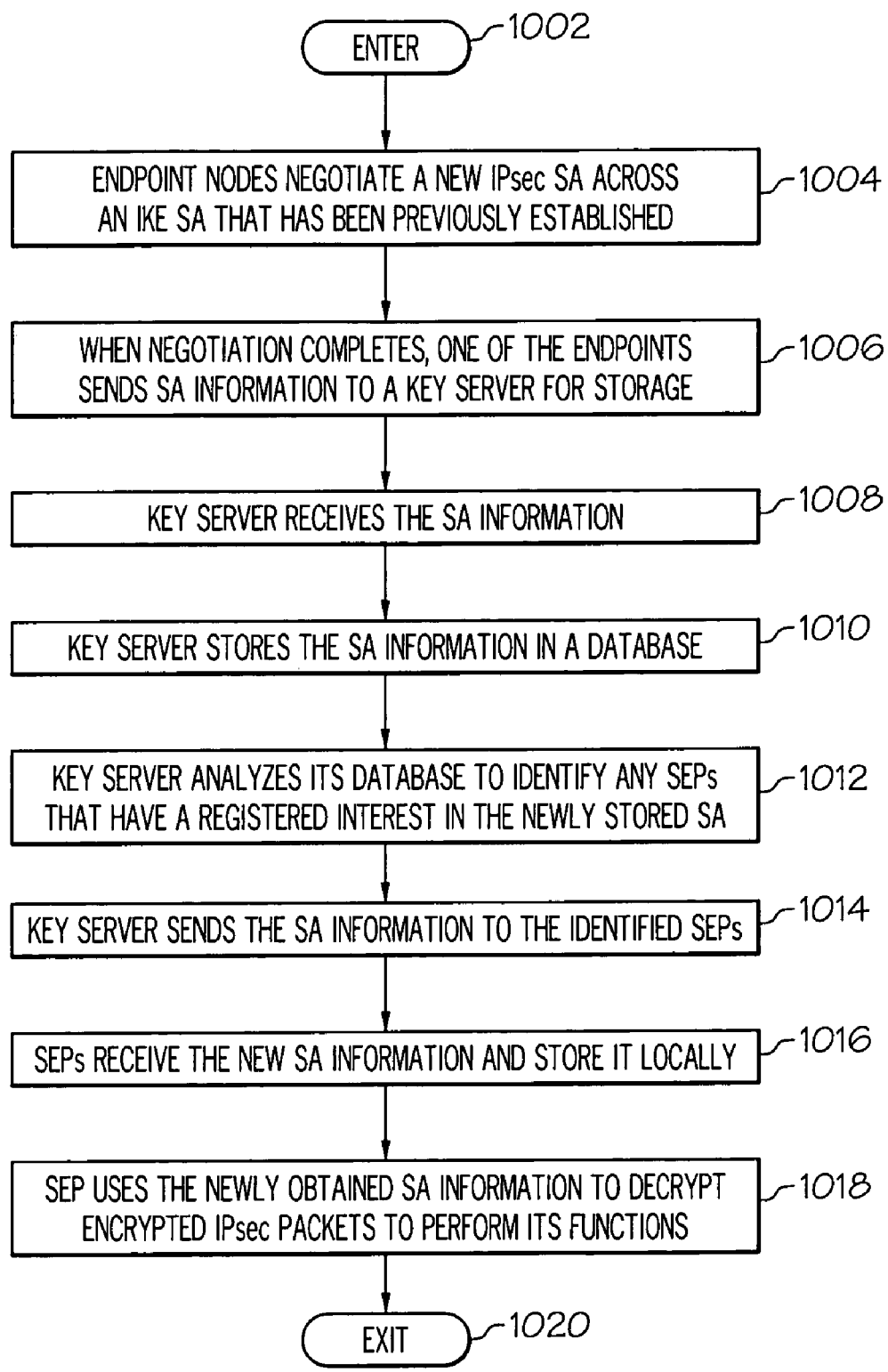
Figure 11:
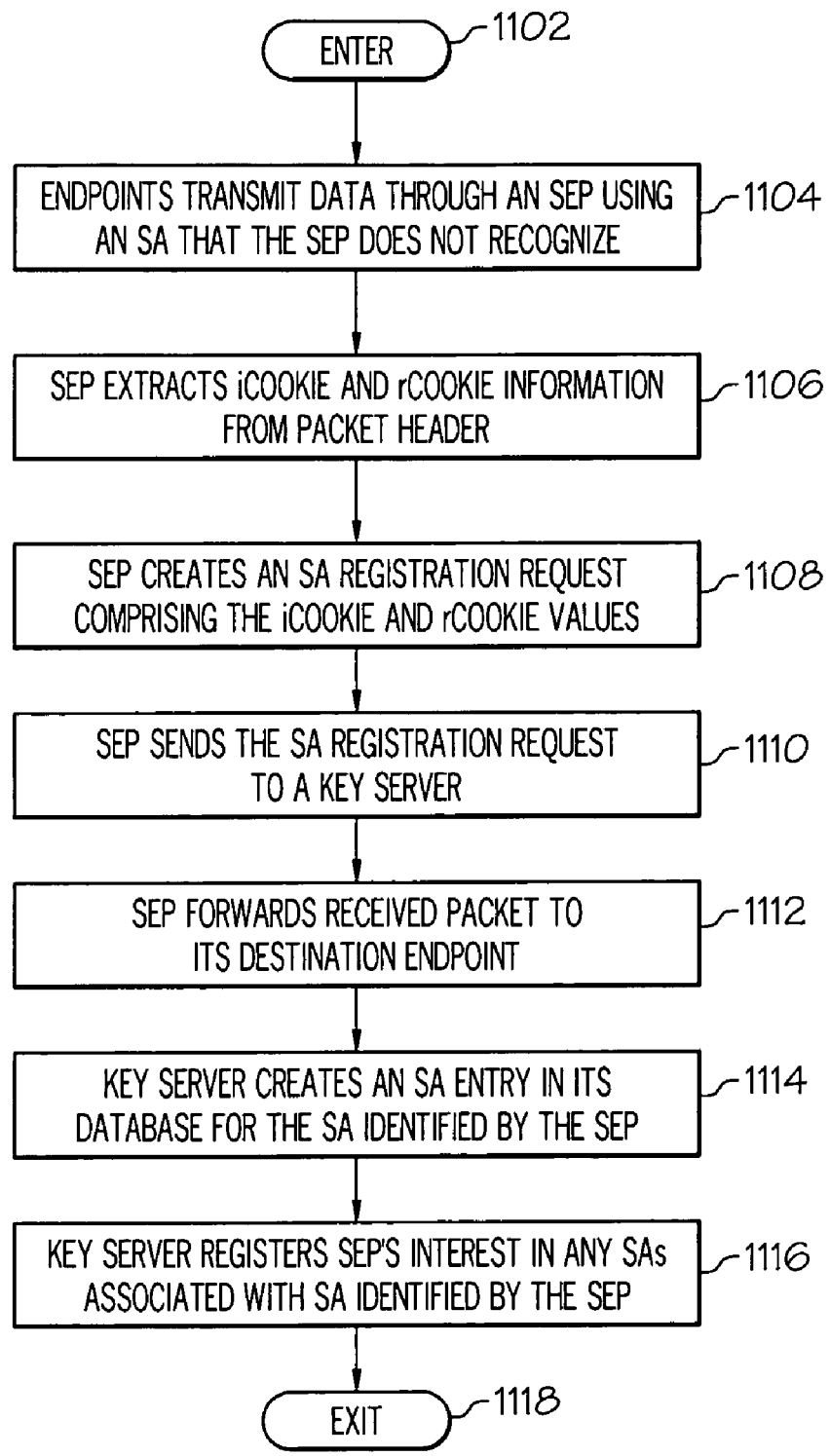

FIGS. 9-11 are operational flow diagrams illustrating various processes for selectively loading SEPs with SA information. The operational flow diagram of FIG. 9 begins at step 902 and flows directly to step 904. An endpoint node 112, at step 904, transmits data to an SEP 116. The SEP 116, at step 906, analyzes the data packet. The SEP 116, at step 908, determines if the received packet is an IPsec packet. If the result of this determination is negative the control flow exits at step 910. If the result of this determination is positive, the SEP 116, at step 912, determines if the SA information for the received IPsec packet is available locally.

If the result of this determination is positive, the SEP 116, at step 914, decrypts the IPsec packet with local SA information. The SEP 116, at step 916, performs its various operations such as intrusion detection. The control flow then exits at step 918. If the result of this determination is negative, the SEP 116, at step 920, drops the packet or allows it to pass unchecked. The SEP 116, at step 922, sends a request to one or more key servers 120 to register an interest for the SA content associated with the received packet. The key server 120, at step 924, analyzes its database 232. The key server 120, at step 926, then determines if it has the SA content locally for this IPsec packet.

If the result of this determination is negative, the key server 120, at step 928, notifies the SEP 116 that it does not have the SA content for the IPsec packet. The control flow then exits at step 930. If the result of this determination is positive, the key server 120, at step 932, sends the SA information to the SEP 116. The SEP 116, at step 934, stores the information locally. This allows the SEP to decrypt any subsequent packet associated with the SA of the initially received IPsec packet. The control flow then exits at step 936.

FIG. 10 is another operational flow diagram illustrating another process for selectively loading SEPs with SA information. The operational flow diagram of FIG. 10 begins at step 1002 and flows directly to step 1004. Endpoint nodes 112, 108, at step 1004, negotiate a new IPsec SA across an existing IKE SA that has already been established. When the negotiation completes, one of the endpoints, at step 1006, sends SA information to a key server 120 for storage. The key server 120, at step 1008, receives the SA information. The key server 120, at step 1010, stores the SA information in a database. The key server 120, at step 1012, analyzes its database 232 to identify any SEPs 116, 118 that have a registered interest in the newly stored SA.

The key server 120, at step 1014, sends the SA information to the identified SEPs 116, 118. The SEPs 116, 118, at step 1016, receive the new SA information and locally store the information. The SEPs 116, 118, at step 1016, use this SA information to decrypt encrypted IPsec packets and to perform their internal operations on the decrypted packets. The control flow then exits at step 1020.

FIG. 11 is another operational flow diagram illustrating yet another process for selectively loading SEPs with SA information. The operational flow diagram of FIG. 11 begins at step 1102 and flows directly to step 1104. IPsec endpoints 108, 112, at step 1104, transmit data through an SEP 116 using an SA that the SEP 116 does not recognize. The SEP 116, at step 1106, extracts the iCookie and rCookie values from the IPsec packet header. The SEP 116, at step 1108, creates an SA registration request comprising at least the iCookie and rCookie values. The SEP 116, at step 1110, sends the SA registration request to one or more key servers 120. The SEP 116, at step 1112, forwards the received IPsec packet to its destination endpoint. The key server 120, at step 1114, creates an SA entry in its database 232 for the SA identified by the SEP 116. The key server 120, at step 1116, registers an interest for the SEP in any SAs that are associated with the IKE SA identified by the SEP 116. The control flow then exits at step 1118.

NON-LIMITING EXAMPLES

The present invention can be realized in hardware, software, or a combination of hardware and software. A system according to one embodiment of the invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for selectively loading a communication network
security enforcement point ("SEP") with security association ("SA") information, the method comprising:
   receiving, by an SEP, at least one encrypted data packet over a secure end-to-end
communications path between at least two endpoints, wherein the SEP is independent from and intermediate to the at least two endpoints;
   determining, by the SEP, that SA information for decrypting the at least one encrypted data packet fails to exist locally at the SEP;
   sending, by the SEP, a request to a communication network key server for SA information associated with the at least one encrypted data packet, wherein the request further notifies the communication network key server to automatically transmit additional SA information generated under an Internet Key Exchange SA associated with the SA information being requested, wherein the additional SA information includes any new SA information established after the request; and
   receiving, by the SEP, from the communication network key server the SA information associated with the at least one encrypted data packet.

2. The method of claim 1, further comprising at least one of:
   dropping the at least one encrypted data packet in response to the SA information failing to exist locally; and
   forwarding, from the SEP, the at least one encrypted data packet to its destination without decrypting the at least one encrypted data packet in response to the SA information failing to exist locally.

3. The method of claim 1, further comprising:
   decrypting, with the SEP, subsequent encrypted data packets associated with the SA information received from the communication network key server.

4. The method of claim 3, further comprising:
   performing, in response to the decrypting, a security function on the subsequent encrypted data packets associated with the SA information, and that have been decrypted.

5. The method of claim 1, wherein the SA information received from the key server comprises at least session key data associated with an SA.

6. The method of claim 1, further comprising:
   establishing a persistent secure session with the key server.

7. The method of claim 1, wherein the request sent to the key server comprises at least an iCookie value and an rCookie value associated with an SA associated with the at least one encrypted data packet.

8. A network element capable of inspecting encrypted data in a secure, end-to-end communications path, the network element comprising:
   a memory;
   a processor communicatively coupled to the memory; and
   a data traffic manager communicatively coupled to the memory and the processor,
   wherein the data traffic manager is configured to:
      receive at least one encrypted data packet over the secure end-to-end communications path between at least two endpoints, wherein the at least one encrypted data packet originated at one of the at least two endpoints and is destined for reception by another of the at least two endpoints, wherein the network element is independent from and intermediate to the at least two endpoints;
      determine that security association ("SA") information for decrypting the at least one encrypted data packet fails to exist locally;
      send a request to a communication network key server for SA information associated with the at least one encrypted data packet, wherein the request further notifies the communication network key server to automatically transmit additional SA information generated under an Internet Key Exchange SA associated with the SA information being requested, wherein the additional SA information includes any new SA information established after the request; and
      receive from the communication network key server the SA information associated with the at least one encrypted data packet.

9. The network element of claim 8, wherein the data traffic manager is further adapted to:
   decrypt subsequent encrypted data packets associated with the SA information received from the communication network key server; and
   perform, in response to the decrypting, a security function on the subsequent encrypted data packets associated with the SA information, and that have been decrypted.

10. The network element of claim 8, wherein the request sent to the communication network key server comprises at least an iCookie value and an rCookie value associated with an SA associated with the at least one encrypted data packet.

11. The network element of claim 8, wherein the data traffic manager is further adapted to:
   drop the at least one encrypted data packet in response to determining that the SA information fails to exist locally; and
   forward the at least one encrypted data packet to its destination without decrypting the at least one encrypted data packet in response to determining that the SA information fails to exist locally.

12. A computer storage program product including instructions selectively loading a communication network security enforcement point ("SEP") with security association ("SA") information, the computer storage program product comprising instructions for:
   receiving, by an SEP, at least one encrypted data packet over a secure end-to-end communications path between at least two endpoints, wherein the SEP is independent from and intermediate to the at least two endpoints;
   determining, by the SEP, that SA information for decrypting the at least one encrypted data packet fails to exist locally at the SEP;
   sending, by the SEP, a request to a communication network key server for SA information associated with the at least one encrypted data packet, wherein the request further notifies the communication network key server to automatically transmit additional SA information generated under an Internet Key Exchange SA associated with the SA information being requested, wherein the additional SA information includes any new SA information established after the request; and
   receiving, by the SEP, from the communication network key server the SA information associated with the at least one encrypted data packet.

13. The computer storage program product of claim 12, further comprising instructions for:
   decrypting subsequent encrypted data packets associated with the SA information received from the communication network key server; and
   performing, in response to the decrypting, a security function on the subsequent encrypted data packets associated with the SA information, and that have been decrypted.

14. The computer storage program product of claim 12, wherein the request sent to the key server comprises at least an iCookie value and an rCookie value associated with an SA associated with the at least one encrypted data packet.

15. The computer storage program product of claim 12, further comprising instructions for:
   dropping the at least one encrypted data packet in response to the SA information failing to exist locally; and
   forwarding the at least one encrypted data packet to its destination without decrypting the at least one encrypted data packet in response to the SA information failing to exist locally.

* * * * *